United States Patent [19]
Hall

[11] Patent Number: 5,458,406
[45] Date of Patent: Oct. 17, 1995

[54] ELECTRONIC PRESSURE RELIEF SYSTEM FOR TRACTION CONTROL

[75] Inventor: Thomas J. Hall, Holly, Mich.

[73] Assignee: ITT Corporation, New York, N.Y.

[21] Appl. No.: 181,928

[22] Filed: Jan. 14, 1994

[51] Int. Cl.[6] .................................................... B60T 8/32
[52] U.S. Cl. ................ 303/113.2; 137/529; 251/129.08; 303/119.2; 303/901; 303/116.1
[58] Field of Search .................................... 303/100, 900, 303/901, 119.2, DIG. 3, DIG. 4, 68–69, 113.1–119.1, 84.1, 84.2, 15; 137/522, 529, 596.17, 596.16; 251/129.19, 129.15, 129.08, 129.01–129.22; 188/181 A

[56] References Cited

U.S. PATENT DOCUMENTS

| | | |
|---|---|---|
| 3,499,689 | 3/1970 | Carp et al. . |
| 3,791,408 | 2/1974 | Saitou et al. ............... 137/529 |
| 3,818,927 | 6/1974 | Zeuner . |
| 3,829,060 | 8/1974 | Von Lewis .......................... 251/129.15 |
| 3,856,047 | 12/1974 | Takayama . |
| 3,874,407 | 4/1975 | Griswold .............................. 137/596.17 |
| 4,077,674 | 3/1978 | Doto . |
| 4,103,695 | 8/1978 | Aono .................................... 251/129.08 |
| 4,161,962 | 7/1979 | Maringer et al. . |
| 4,313,590 | 2/1982 | Nishimiya ....................... 251/129.08 |
| 4,361,164 | 11/1982 | Sakakibara et al. . |
| 4,386,626 | 6/1983 | Hehl . |
| 4,548,233 | 10/1985 | Wolfges ................................. 137/529 |
| 4,590,970 | 5/1986 | Mott . |
| 4,655,254 | 4/1987 | Hafner et al. ........................ 251/129.15 |
| 4,662,605 | 5/1987 | Garcia .................................... 251/129.08 |
| 4,755,008 | 7/1988 | Imoto et al. ............................ 303/110 |
| 4,766,921 | 8/1988 | Williams ............................. 251/129.08 |
| 4,789,208 | 12/1988 | Kohno ..................................... 303/115 |
| 4,802,562 | 2/1989 | Kuroyanagi et al. .................... 192/1.23 |
| 4,909,279 | 3/1990 | Nakamura et al. . |
| 4,989,829 | 2/1991 | Bickel . |
| 4,995,586 | 2/1991 | Gensberger et al. .............. 251/129.08 |
| 5,012,722 | 5/1991 | McCormick . |
| 5,044,702 | 9/1991 | Beck et al. ............................. 303/100 |
| 5,076,538 | 12/1991 | Mohr et al. ........................... 303/119.2 |
| 5,129,714 | 7/1979 | Latarnik .................................. 303/116 |
| 5,163,477 | 11/1992 | Takano et al. ...................... 251/129.02 |
| 5,167,442 | 12/1992 | Alaze et al. .......................... 303/113.2 |
| 5,195,809 | 3/1993 | Burgdorf ................................. 303/116 |
| 5,199,769 | 4/1993 | Beck et al. ........................... 303/114.1 |
| 5,207,484 | 5/1993 | Bleckmann et al. ..................... 303/110 |
| 5,207,486 | 5/1993 | Tanaka ................................. 303/113.2 |
| 5,210,692 | 5/1993 | Fennel et al. ....................... 364/426.02 |
| 5,217,283 | 6/1993 | Watanabe ............................ 303/113.2 |
| 5,232,195 | 8/1993 | Torrielli ............................... 251/129.08 |
| 5,261,731 | 11/1993 | Yogo et al. ........................... 303/119.2 |
| 5,318,066 | 6/1994 | Burgdorf et al. ........................ 137/529 |
| 5,322,259 | 6/1994 | Sauer et al. ......................... 251/129.08 |
| 5,388,899 | 2/1995 | Volz et al. ............................ 303/119.2 |

FOREIGN PATENT DOCUMENTS

| | | |
|---|---|---|
| 0267162 | 5/1988 | European Pat. Off. . |
| 4002865 | 8/1991 | Germany . |
| 57-90475 | 6/1982 | Japan . |
| 58-46284 | 3/1983 | Japan . |
| 62-220779 | 9/1987 | Japan . |
| 0292760 | 4/1990 | Japan . |
| 03213453 | 9/1991 | Japan . |
| WO93221169 | 11/1993 | WIPO . |

OTHER PUBLICATIONS

International Application No. WO93/22169.

*Primary Examiner*—Douglas C. Butler
*Attorney, Agent, or Firm*—Dykema Gossett

[57] ABSTRACT

An electronic pressure relief system for a traction slip control vehicle brake system maintains the pressure within the brake system at its desirable level by electronically controlling an isolation valve coupled to the brake conduit. The isolation valve is controlled by supplying an energizing current to the valve at a preselected level such that the holding pressure exerted by the valve is maintained at a level approximately equal to the maximum desired pressure level to be maintained within the brake conduit during the traction slip control maneuver.

9 Claims, 2 Drawing Sheets

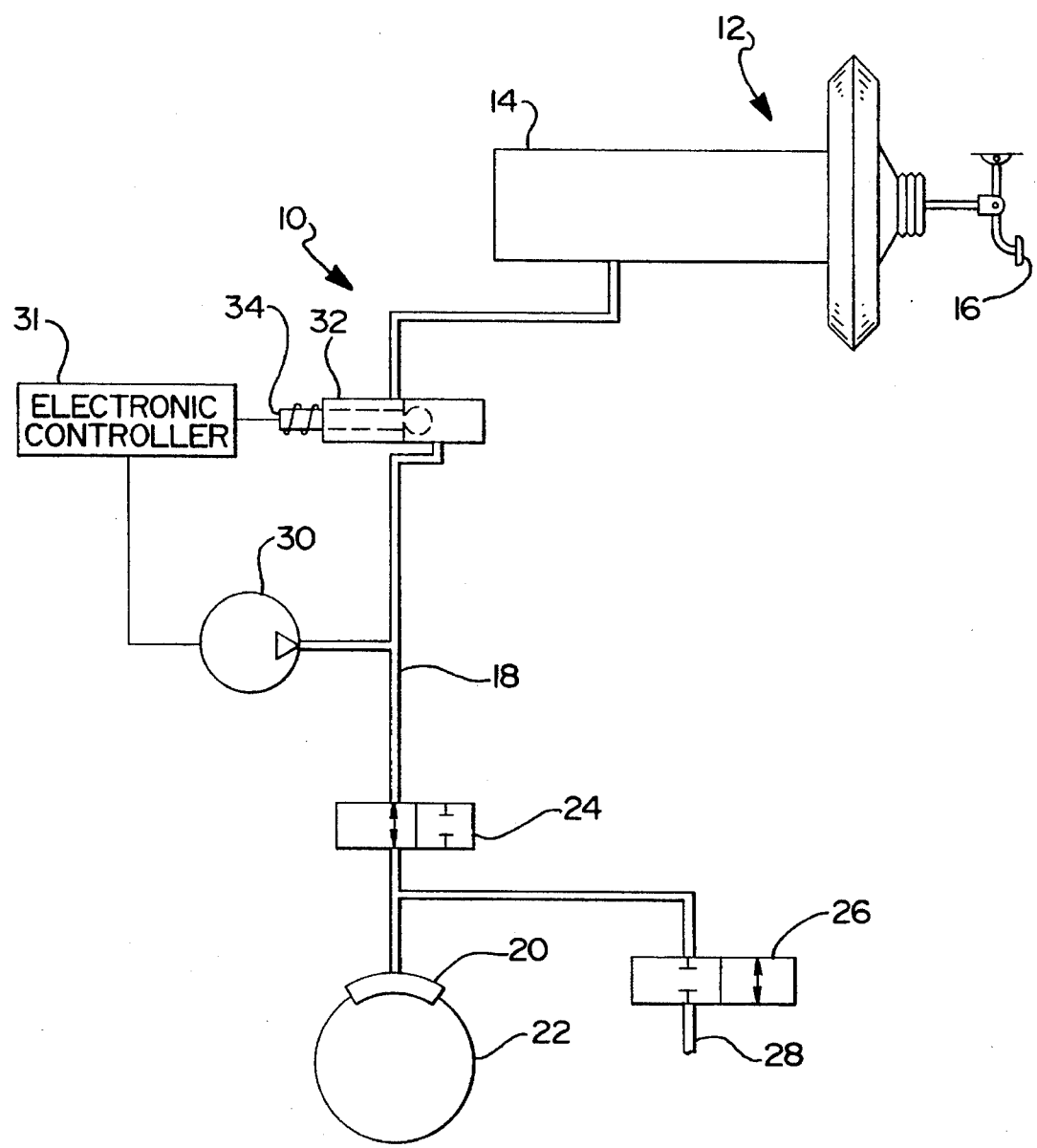
FIG IA

ELECTRONIC PRESSURE RELIEF SYSTEM FOR TRACTION CONTROL

BACKGROUND OFT HE INVENTION

1. Field of the Invention

This invention generally relates to vehicle brake systems. More specifically, this invention relates to controlling the pressure within a vehicle brake system during a traction slip control maneuver. This invention includes a device and methodology for controlling electromagnetically activated relief valves within a vehicle brake system having traction slip control capability, by selectively energizing the electromagnetic component of the relief valve. The relief valve is selectively energized in order to control the maximum pressure obtained during a traction slip control maneuver.

2. The Prior Art

Modern vehicle braking systems include the capability of having antilocking braking action and performing a traction slip control maneuver. Braking systems including traction slip control are typically characterized by the ability to generate a braking force within the braking system independent of the vehicle operator in order to create some desired level of pressure causing the wheel brakes to engage. In this general manner, traction slip control is achieved because the wheels, which would otherwise spin in an undesirable manner not maintaining contact with the driving surface, are prevented from slipping. Braking systems that include traction slip control typically include an auxiliary pressure pump which is motor controlled to create the desired pressure within the braking system in order to complete a traction slip control maneuver. Such auxiliary pressure pumps act independently of the operation of a brake pedal normally associated with the brake system and are typically isolated from the master cylinder of the brake system. Because of the nature of the pressure created by the auxiliary pressure pump for a traction slip control maneuver (TSCM) it is necessary to provide a means for allowing the pressure within the braking system to be relieved when it becomes desirable to end the TSCM. Similarly, it is desirable to relieve the pressure within the braking system in order to maintain a desired pressure for completing the TSCM.

One attempt at maintaining the desired pressure within the braking system during a TSCM includes incorporating mechanical relief valves into the braking system. Conventional mechanical relief valves have several drawbacks and disadvantages associated with them. For example, mechanical relief valves are typically noisy. It is desirable to reduce the amount of noise generated by an automotive braking system in order to increase the vehicle operator's comfort and to enhance the satisfaction of the driving experience. Another drawback associated with including a mechanical relief valve in a traction slip control brake system is that the mechanical relief valves introduce extra hardware that may otherwise be unnecessary. It is desirable to reduce the amount of hardware associated with a vehicle braking system in order to improve system efficiency and diagnostic capabilities, and to make the overall vehicle manufacturing process more efficient.

Another attempt at maintaining the desired pressure within a vehicle braking system that includes traction slip control includes the addition of sophisticated pressure modulators within the braking system. Typical pressure modulators include the drawbacks of being relatively sophisticated and cumbersome and therefore introduce complexity into the braking system that is preferably avoided.

This invention eliminates the need for such mechanical relief valves or pressure modulators and controls the pressure within the braking system during a TSCM by selectively controlling an electromagnetically actuated isolation valve. This invention includes the realization that an electromagnetically actuated isolation valve maintains a holding pressure that is proportional to the amplitude of the energizing current supplied to the valve. Therefore, this invention presents the advantages of reducing the complexity and number of hardware components associated with a traction slip control braking system. Further, this invention improves the braking system function by eliminating the undesirable noise commonly associated with mechanical relief valves. Other advantages provided by this invention include improved system diagnostics and the ability to selectively control the pressure maintained within the braking system during a traction slip control maneuver.

SUMMARY OF THE INVENTION

In its most general terms, this invention includes a method of relieving pressure within a vehicle brake system that has an electromagnetically actuated isolation valve during a traction slip control maneuver. The method associated with this invention includes three basic steps. First, a maximum desirable pressure value that is to be maintained during the traction slip control maneuver is determined. Second, a required current is determined for energizing the isolation valve such that the isolation valve opens in a pressure relieving manner when the pressure within the brake system exceeds the maximum desired pressure determined in the previous step. Lastly, the isolation valve is energized with the required current.

In a presently preferred embodiment, the electromagnetically actuated isolation valve is energized by providing a series of current pulses to the electromagnetic portion of the valve. In one preferred embodiment, the electromagnetic portion includes a solenoid. A series of current pulses are preferably generated by an electronic controller associated with the braking system. The series of pulses effectively creates an average current value of the energizing current that is supplied to the isolation valve. In the preferred embodiment, the average value of the energizing current can be modified by varying the pulse width. Such modification and control of the pulse width and pulse amplitude is preferably accomplished by logic control within an electronic controller associated with the vehicle braking system.

These and other features and objects of this invention will become apparent to those skilled in the art from the following detailed description of the preferred embodiments taken in connection with the appended drawings, the following being a brief description of the latter.

BRIEF DESCRIPTION OF THE DRAWINGS

FIG. 1A is a schematic diagram of selected portions of a vehicle braking system including traction slip control capability.

DETAILED DESCRIPTION OF THE PREFERRED EMBODIMENTS

Figure 1B:
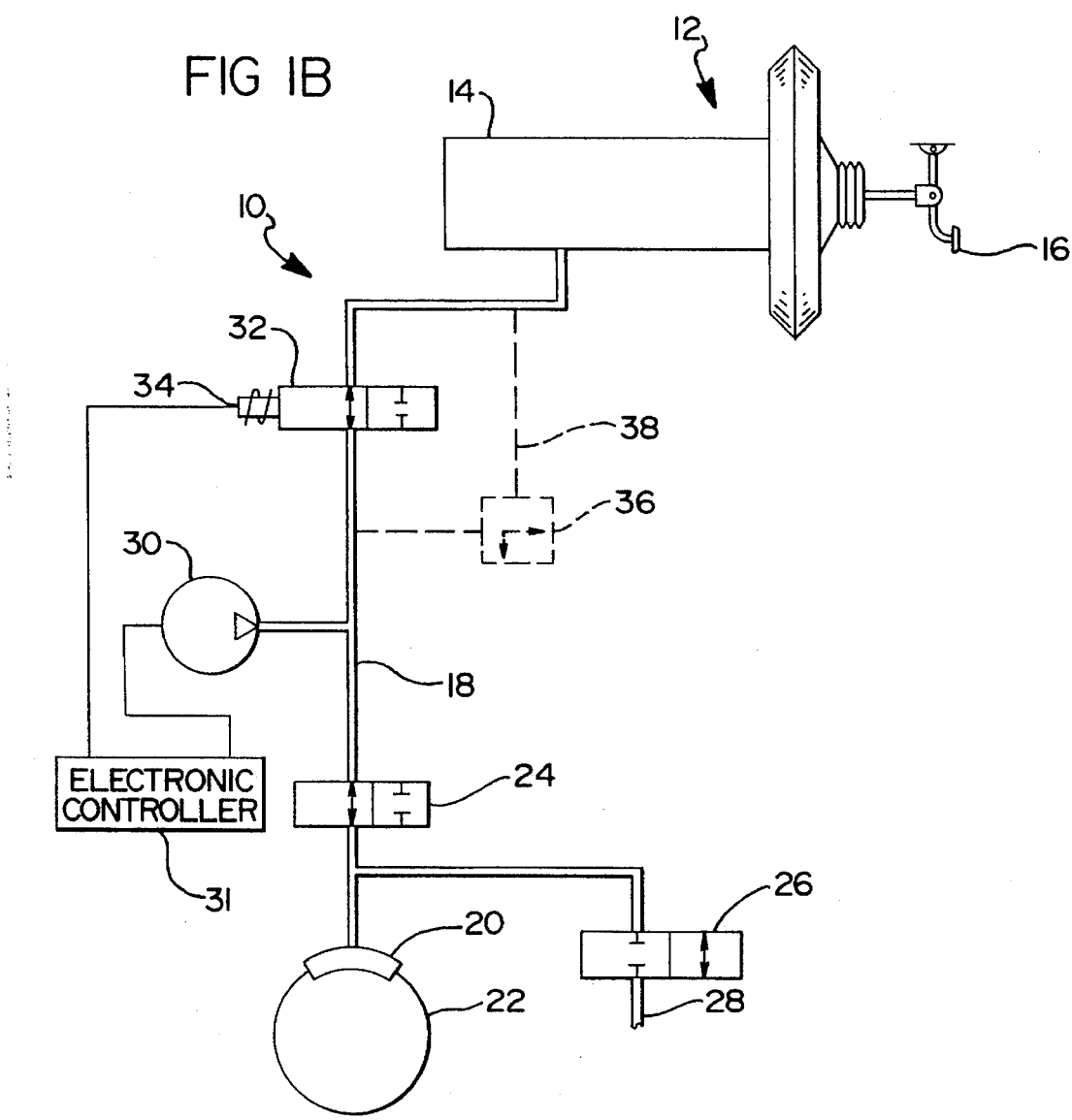
FIG. 1B is a schematic diagram of selected portions of a vehicle braking system includng traction slip control capability with a mechanical relief valve dedicated to system redundance.

FIGS. 1A and 1B schematically and diagrammatically illustrates selected portions of a vehicle braking system 10. Braking system 10 includes master cylinder 12 which facilitates supplying hydraulic braking fluid to the braking system from fluid reservoir 14. Brake pedal 16 is provided within a vehicle such that a vehicle operator can activate the braking system by depressing the pedal 16 in a conventional manner.

Brake conduit 18 is provided in order to enable communication of hydraulic brake fluid from reservoir 14 to wheel brake 20 in order to cause a desired deceleration of wheel 22. Normally open valve 24 is provided between reservoir 14 and wheel brake 20 along conduit 18 in order to facilitate proper braking application in a conventional manner. Normally open valve 24 is preferably an electromagnetically controlled valve typically associated with an antilocking brake system. Normally closed valve 26 is provided for antilocking braking applications such that the brake fluid within conduit 18 can be redistributed to other portions (not illustrated) of the braking system through relief conduit 28.

Auxiliary pump 30 is provided for traction slip control maneuvers. Auxiliary pump S0 is preferably connected to a pump motor (not specifically illustrated) that is, in turn, controlled by an electronic controller 31 associated with the braking system 10. The electronic controller 31 preferably has the capability of determining when a traction slip control maneuver is desirable and responsively activates auxiliary pump 30 in order to cause an increased pressure build up in brake conduit 18 as will be described in further detail below. Such electronic controllers include conventional microprocessors and are known in the art.

Isolation valve 32 is provided between reservoir 14 and pump 30 along conduit 18. Isolation valve 32 is used to enable brake fluid to pass through conduit 18 into reservoir 14 when pressure is created within conduit 18 by pump 30 in a manner to be described in further detail below. Isolation valve 32 is electromagnetically actuated and, preferably by a solenoid 34 which receives current through electronic circuitry associated with braking system 10.

Typical conditions that require a traction slip control maneuver occur when wheel disk 22 is spinning in an undesirable fashion without making proper tractional contact with the driving surface. Under these conditions, it is possible to alleviate or minimize the amount of undesirable slipping by causing wheel brake 20 to bear against wheel disk 22. Wheel brake 20 is caused to bear against wheel disk 22 by causing an increase in pressure within brake conduit 18 thereby causing wheel disk 22 to slow down such that a proper engagement with the driving surface can be obtained. The increase in pressure within brake conduit 18 is accomplished by closing isolation valve 32 and activating auxiliary pump 30. Auxiliary pump 30 has its suction side opposite the connection to conduit 18 such that an increase in brake fluid pressure is build up within conduit 18 causing wheel brake 20 to bear against wheel disk 22. The suction side of pump 30 is coupled to the low pressure end of master cylinder 12 through conduit 31. The illustrated coupling of the suction side of pump 30 to the remainder of the brake system 10 is only one example of a strategy for such coupling. Other strategies are possible within the scope of this invention.

Because of the nature of pump 30 and the configuration as illustrated in FIG. 1 it becomes desirable during a traction slip control maneuver to limit system pressure within conduit 18. It is desirable to relieve pressure from conduit 18 after a desired pressure level has been maintained for a reasonable or desired period of time.

In some configurations of braking systems that include traction slip control, a mechanical relief valve 36 (shown in phantom in FIG. 1B) is provided between an auxiliary pump 30 and a reservoir 14 for facilitating relief of the undesirable pressure within brake conduit 18. The brake fluid can then travel through brake conduit 38 (illustrated in phantom) and thereby release pressure from brake conduit 18. The preferred embodiment of this invention illustrated in FIG. 1A eliminates the need for mechanical relief valve 36 and instead utilizes isolation valve 32 for relieving any undesired pressure from within brake conduit 18. In another embodiment, as shown in FIG. 1B, mechanical relief valve 36 is provided and dedicated to system redundancy.

Upon initiation of a traction slip control maneuver, the electronic controller 31 associated with the braking system 10 supplies an energizing current to solenoid 34 on isolation valve 32. Isolation valve 32 is preferably a type of valve known as a ball and seat valve. Isolation valve 32 is commonly known in the art as an SV valve. The holding pressure of isolation valve 32 is proportional to the energizing current supplied to solenoid 34. Isolation valve 32 will remain closed against pressure within conduit 18 only to the extent that the energizing current supplied to solenoid 34 produces a holding pressure that exceeds the fluid pressure within conduit 18. Therefore, by strategically limiting the energizing current to solenoid 34, isolation valve 32 will open in response to pressure within conduit 18 when that pressure exceeds the holding pressure achieved in isolation valve 32 responsive to the energizing current. By maintaining the energizing current at a preselected average value, the pressure within brake conduit 18 during a traction slip control maneuver is maintained to be equal to or below a maximum desired level.

Therefore, mechanical relief valve 36 can be eliminated from a braking system when it includes an isolation valve 32 that is energized in accordance with the methodology associated with this invention.

The method associated with this invention includes three basic steps. First, a maximum desired pressure value to be maintained within braking system 10 during a traction slip control maneuver is determined. Second, the determination is made regarding the required energizing current needed to be supplied to solenoid 34 such that the isolation valve 32 opens in a pressure relieving manner when the pressure within conduit 18 equals or exceeds the maximum desired pressure determined in the first step. Lastly, the isolation valve is energized using the required current value determined in the second step.

The inclusion of an electronic controller 31 in a vehicle braking system enables one to practice the methodology associated with this invention in a variety of manners. This is due, in part, to the nature of the microprocessors commonly associated with modern vehicle braking system electronic controllers.

Figure 2:
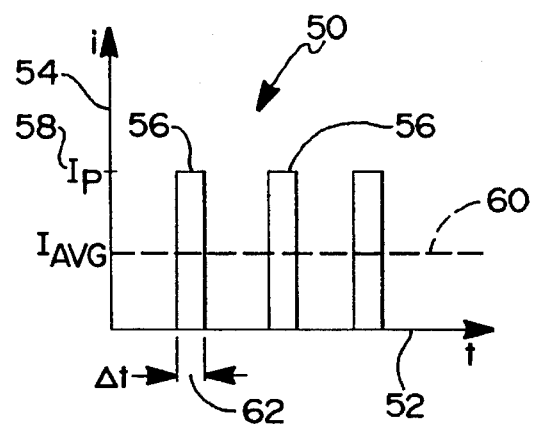
FIG. 2 is a timing diagram illustrating a preferred method of supplying an energizing current to an isolation valve associated with this invention.

In the preferred embodiment of this invention, the electronic controller 31 is used to provide an energizing current to the isolation valve. FIG. 2 illustrates a preferred method of providing energizing current to isolation valve 32. FIG. 2 is a plot diagram of current versus time. FIG. 2 includes plot 50 which has a time axis 52 and current axis 54. Pulses 56 are illustrated having a maximum value of $I_{pulse}$ illustrated at 58 along axis 54. When taken in the aggregate, pulses 56 sustain an average energizing current having a value of $I_{avg}$ illustrated at 60. The value for $I_{avg}$ can be altered by changing the pulse width 62 of pulses 56. A wider pulse width or longer duration for an individual pulse 56 will provide an average energizing current having a higher value. Similarly, reducing the pulse width 62 causes a decrease in the average value of the energizing current. In this manner, the electromagnetically actuated isolation valve 32 is supplied with an energizing current having a preselected value in order to achieve a holding pressure exerted by isolation valve 32 that corresponds to a maximum desired pressure within brake conduit 18 during a traction slip control maneuver.

One advantage associated with the preferred embodiment discussed in association with the illustration of FIG. 2 is that the energizing current can be varied according to driving conditions or according to particular host vehicle requirements, for example. Further, various information within the electronic controller can be used to vary the holding pressure achieved by isolation valve 32 according to driving conditions as will be appreciated by those skilled in the art.

Figure 3:
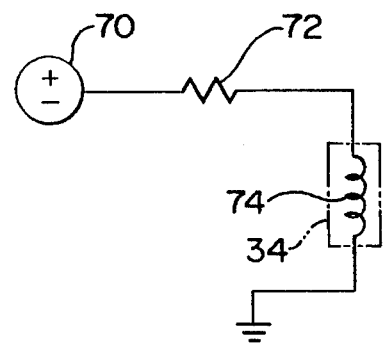
FIG. 3 is a schematic diagram of another embodiment for limiting the current supply to an isolation valve associated with this invention.

FIG. 3 is a schematic illustration of another embodiment for implementing the methodology associated with this invention. The circuit schematic of FIG. 3 includes voltage source 70, resistor 72 and solenoid coil 74. Solenoid coil 74 is the coil associated with solenoid 34 of isolation valve 32. Resistor 72 is provided between voltage source 70 and coil 74 in order to attenuate the amount of current that is supplied to coil 74. It is to be understood that resistor 74 is only one example of a means for attenuating the current that is supplied to the electromagnetically actuated isolation valve associated with this invention. Other current amplitude limiting devices can be used in place of a resistor. As one skilled in the art will appreciate, knowing the value of the voltage produced by voltage source 70 and the value of resistor 72, the energizing current supplied to coil 74 can be determined. A variable resistor is used in embodiments wherein it is desirable to vary the amount of energizing current supplied to coil 74 under varying driving conditions.

The preceding description is exemplary rather than limiting in nature. Variations and modifications are possible without departing from the spirit and purview of this invention, the scope of which is limited only by the appended claims.

I claim:

1. A system for relieving undesireable pressure from within a vehicle brake system, comprising:

a reservoir for holding hydraulic fluid;

a conduit connecting said reservoir to a wheel brake for communicating hydraulic fluid from said reservoir to said wheel brake;

an electromagnetically actuated isolation valve connected to said conduit, said isolation valve having a first valve position for isolating said wheel brake from said reservoir, said isolation valve having a holding pressure associated with said first valve position, said holding pressure being proportional to an actuating signal supplied to said isolation valve, said valve opening from said first valve position in response to a pressure within said system that exceeds said holding pressure;

a pump for generating braking pressure within said conduit to cause said hydraulic fluid to bear against said wheel brake when said isolation valve is in said first valve position, said pump being hydraulically connected to said conduit between said isolation valve and said wheel brake; and means for supplying an actuating signal to said isolation valve such that said valve opens from said first valve position to allow hydraulic fluid to exit said conduit into said reservoir to thereby relieve undesireable pressure from within said conduit during a traction control maneuver, wherein said holding pressure is proportional to a current amplitude of said actuating signal, wherein said signal supplying means produces said actuating signal having a preselected current amplitude such that said holding pressure is maintained at a preselected level, wherein said signal supplying means comprises a microprocessor electronically coupled with said system, wherein said actuating signal is produced by said microprocessor, said signal comprising a series of pulses having a preselected pulse amplitude, pulse width and frequency such that said actuating signal has an average current amplitude.

2. The system of claim 1, wherein said average current amplitude causes said holding pressure to be maintained at said preselected level such that said valve opens when said holding pressure is exceeded by the pressure within said conduit caused by said pump such that said pressure within said conduit does not exceed a preselected maximum pressure.

3. The system of claim 1, wherein said signal supplying means comprises a voltage source coupled through a current attenuating means to said isolation valve such that said actuating signal has a preselected current amplitude.

4. The system of claim 1, wherein said isolation valve comprises a solenoid actuated ball and seat valve, said solenoid causing said holding pressure to be maintained at a preselected level responsive to said actuating signal.

5. The system of claim 4, wherein said holding pressure is proportional to a current amplitude of said actuating signal.

6. The system of claim 4, wherein said signal supplying means comprises a microprocessor electronically coupled to said system and said actuating signal is produced by logic control within said microprocessor.

7. A method of relieving pressure within a vehicle brake system having an electromagnetically actuated isolation valve during a traction slip control maneuver, comprising the steps of:

(A) determining a maximum desired pressure value to be maintained during the traction slip control maneuver;

(B) determining a required current for energizing the isolation valve such that the isolation valve opens in a pressure relieving manner responsive to pressure within the brake system when said pressure exceeds the maximum desired pressure determined in step (A);

(C) energizing the isolation valve with the required current determined in step B, wherein step (A) is performed by the substeps of monitoring at least one parameter of a set of parameters, using an electronic brake system controller, to thereby determine the maximum desired pressure, said set of parameters including wheel speed, engine revolution relative to time and brake fluid pressure, wherein step (B) is performed by the substeps of determining a relationship between energizing current and holding pressure wherein holding pressure equals the maximum pressure the isolation valve will maintain without opening, wherein step (C) is performed by limiting the energizing current to the determined level using an electronic controller associated with the brake system, wherein energizing current is supplied by generating a series of electrical signal pulses having a preselected pulse amplitude, pulse width and frequency.; whereby an average energizing current energizes the isolation valve, the average energizing current amplitude being a preselected value.

8. The method of claim 7, wherein step (C) is performed by the substeps of limiting current supplied to the electromagnetically activated isolation valve, using a current attenuating means having a preselected attenuation value.

9. The method of claim 8 wherein the current attenuating means comprises a resistor.

* * * * *